United States Patent [19]

Uchida et al.

[11] Patent Number: 4,555,006

[45] Date of Patent: Nov. 26, 1985

[54] AUTOMATIC ENGINE STOP AND START SYSTEM

[75] Inventors: Shigekatsu Uchida; Takao Akatsuka; Takahide Kawamura, all of Aichi, Japan

[73] Assignee: Toyota Jidosha Kogyo Kabushiki Kaisha, Toyota, Japan

[21] Appl. No.: 360,973

[22] Filed: Mar. 23, 1982

[30] Foreign Application Priority Data

Jul. 28, 1981 [JP] Japan ................................ 56-117999

[51] Int. Cl.⁴ ............................................. B60K 41/02
[52] U.S. Cl. .................................. 192/0.084; 192/0.096
[58] Field of Search ............... 192/0.084, 0.048, 0.096, 192/0.098; 123/179 G, 179 B, 179 BG, 198 F

[56] References Cited

U.S. PATENT DOCUMENTS

| 1,845,767 | 2/1932 | Stecher | 123/179 B |
| 3,872,316 | 3/1975 | Kurii et al. | 123/179 B |
| 4,192,279 | 3/1980 | Maisch et al. | 123/198 F |
| 4,402,286 | 9/1983 | Pagel et al. | 123/179 B |

Primary Examiner—George H. Krizmanich
Attorney, Agent, or Firm—Oblon, Fisher, Spivak, McClelland & Maier

[57] ABSTRACT

Clutch operation signal issued in operational association with depression of a clutch pedal are taken as answer-back signals into an electronic control unit (ECU), a starter start command signal is issued in response to one of these answer-back signals. Additionally, a clutch upper switch and a clutch lower switch, which constitute a clutch sensor and are connected in series to each other, are inserted into a starter relay driving system, so that start due to mistaken operation and the like of ECU can be avoided.

3 Claims, 3 Drawing Figures

AUTOMATIC ENGINE STOP AND START SYSTEM

BACKGROUND OF THE INVENTION

1. Field of the Invention

This invention relates to improvements in an automatic engine stop and start system for automatically stopping and starting an engine in accordance with the operating conditions.

2. Description of the Prior Art

Some of the motor cars are equipped with automatic engine stop and start systems capable of automatically stopping the engine when the motor car stops at a crossroads or the like during running through a town and of starting the engine by an ordinary departing operation (depressing of a clutch pedal, for example) at the time of restarting the engine. Equipping the motor cars with such systems as described above makes it possible to reduce the exhaust gases in volume and the consumption of fuel, as the engines are operated when deemed necessary.

Control of the automatic stop and start of the engine is effected by an electronic control unit (hereinafter referred to briefly as "ECU"), such for example as a microcomputer. The conventional automatic stop and start system has been constructed such that a starter relay is actuated in response to a start command from ECU and the clutch operation. In this case, the starter start command is generated when determination is made based on that the automatic stop and start system is "ON" and the engine is stopped in operation by the automatic stop and start system.

As described above, heretofore, the common practice has been such that if the clutch operation is present, the starter is considered to be started, and, even when such an accident has taken place that a clutch operation signal has been issued in spite of that no clutch has been operated, no check has been made on the side of ECU. In consequence, this has been a uncertain factor in the aspect of safety.

SUMMARY OF THE INVENTION

The present invention has as its object the provision of an automatic stop and start system wherein mistaken operation by ECU is eliminated and safety at the time of start is improved.

The present invention contemplates that a starter start signal is issued only when a clutch operation signal to be issued in operational association with a depression of a clutch is obtained.

Figure 1:
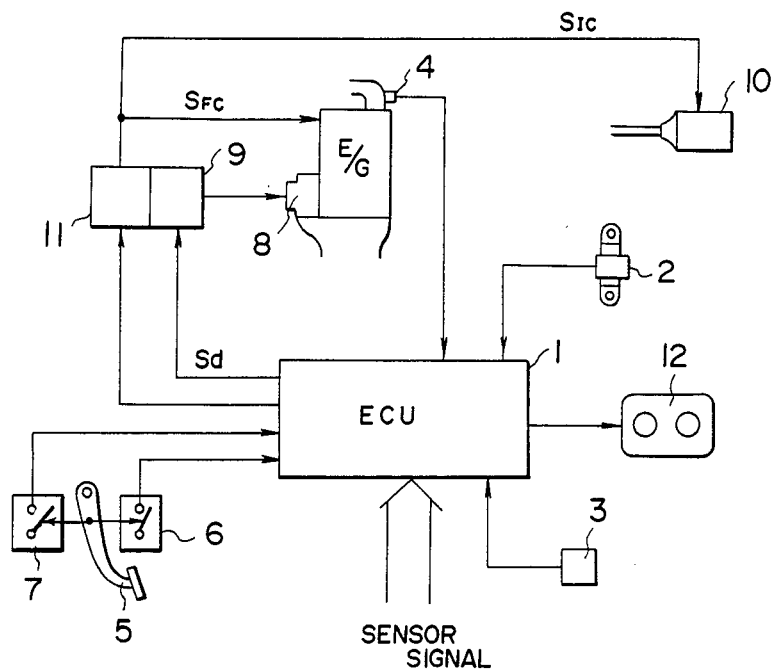
FIG. 1 is a block diagram showing an embodiment of the present invention.

The embodiment of the present invention shown in FIG. 1 comprises: ECU as being the core; a speed sensor for detecting the vehicle speed; an engine rotation detecting circuit; a water temperature sensor for detecting the temperature of the engine cooling water; an upper and a lower switches for issuing output signals when the clutch operation is at an upper position or a lower position; an engine starting mechanism; and a control relay.

Taken into ECU 1, i.e., a microcomputer 1 as the data signals are:

outputs (sensor signals) used for various types of controls for various types of sensors and switches (a thermosensor, a light switch, a door switch, a turn signal switch, an air conditioner switch, an oil pressure switch and the like) other than those to be described hereinafter;

an output from the speed sensor 2;

an output from the engine rotation detecting circuit 3;

an output from the water temperature sensor 4 secured to the engine; and outputs from the upper switch 6 to be turned "ON" in operational association with the operation of the clutch pedal 5 (turned "ON" when the clutch pedal 5 is slightly depressed) and the lower switch 7 (turned "ON" when the clutch pedal 5 is deeply depressed). Those to be controlled by the computer 1 includes: a starter relay 9 for controlling a starter 8 to be connected to the engine at a predetermined time; an engine stop control relay 11 for issuing an ignition cut command $S_{IC}$ to an ignition coil and a fuel cut command $S_{FC}$ to the engine; and an indication panel 12 for indicating by turned-on lights the stopped state or operating condition of the engine.

Figure 2:
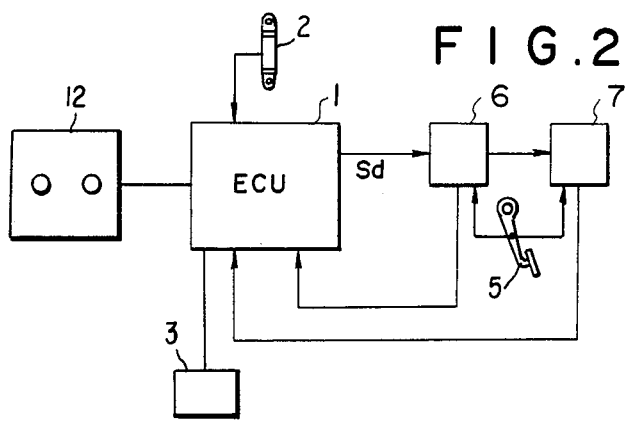
FIG. 2 is a circuit diagram showing a portion of a switch operationally associated with the clutch according to the present invention.

As shown in FIG. 2, the upper switch 6 and the lower switch 7, which are connected in series, are inserted between ECU 1 and the starter relay 9, so that the starter relay 9 can avoid mistaken operation.

Figure 3:
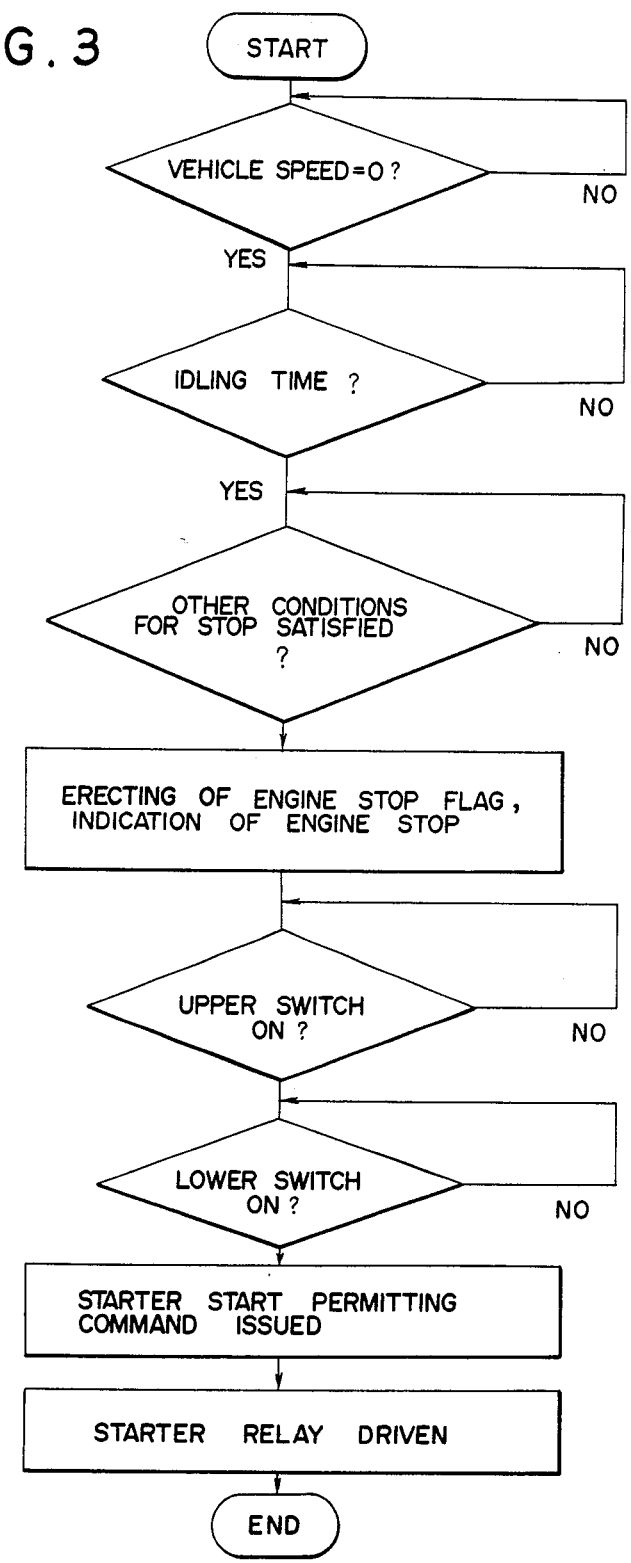
FIG. 3 is a flow chart showing an example of the process according to the present invention.

FIG. 3 is a flow chart showing the process by ECU 1 having the arrangement shown in FIG. 2.

The speed sensor 2 detects the stopped state of the vehicle body, and the engine rotation detecting circuit 3 detects the rotation of the engine being within the idling rotation range. And, if other conditions of stop are satisfied, then an engine stop flag is erected and an indication lamp for indicating the stopped state of the engine is turned "ON" in the indication panel 12. Under this conditions, if a driver operates the clutch pedal 5, then the upper switch 6 is turned "ON" when the clutch pedal 5 is slightly depressed, and the lower switch 7 is turned "ON" when the clutch pedal 5 is further depressed. If it is ascertained that both the upper and lower switches 6 and 7 are turned "ON", in response to which ECU 1 issues a starter start permitting command, and the starter relay 9 is driven on "AND" condition that the both switches are to be turned "ON". The starter 8 is rotatably driven by the operation of the starter relay 9 during operation of the clutch 5.

As apparent from the foregoing, according to the present invention, a fail-safe function is added to the start of the starter, so that safety during the start of the starter can be improved.

It should be apparent to one skilled in the art that the abovedescribed embodiments are merely illustrative of but a few of many possible specific embodiments of the present invention. Numerous and varied other arrangements can be readily devised by those skilled in the art without departing from the spirit and scope of the invention.

What is claimed is:

1. A system for automatically stopping and restarting a motor vehicle engine having, a starter with a starter relay and a clutch pedal operatively associated therewith, in response to predetermined conditions comprising:

detecting means coupled to said motor vehicle for detecting various conditions of said motor vehicle;

control means coupled to said detecting means for judging whether or not predetermined conditions for automatic starter energization are fulfilled to generate a drive signal wherein said predetermined conditions include at least a full and a slight depression of said clutch pedal;

first connecting means coupled to said control means for outputting said driving signal to said starter relay when said predetermined conditions are met;

clutch switch disposed between said first connecting means and said starter relay, mechanically connected with said clutch pedal and closed in response to the full depression of said clutch pedal; and second connecting means coupled to said switch means for energizing said starter relay.

2. A system for automatically stopping and restarting a motor vehicle engine having a starter with a starter relay and a clutch pedal operatively associated therewith, in response to predetermined conditions comprising:

detecting means coupled to said motor vehicle for detecting various conditions of said motor vehicle;

control means coupled to said detecting means for judging whether or not predetermined conditions for automatic starter energization are fulfilled to generate a drive signal wherein said predetermined conditions include at least a full and a slight depression of said clutch pedal;

upper clutch signal mechanically connected with said clutch pedal and closed in response to the slight depression of said clutch pedal; and lower clutch switch mechanically connected with said clutch pedal and closed in response to the full depression of said clutch pedal; wherein said upper and lower clutch switches are connected in series with each other between said control means and said starter relay, whereby said drive signal is supplied to said starter relay through said upper and lower clutch switches.

3. A system for automatically stopping and restarting a motor vehicle engine having a starter with a starter relay and a clutch pedal operatively associated therewith, in response to predetermined conditions comprising:

detecting means coupled to said motor vehicle for detecting various conditions of said motor vehicle;

control means coupled to said detecting means for judging whether or not predetermined conditions for automatic starter energization are fulfilled to generate a drive signal wherein said predetermined conditions include at least a full and a slight depression of said clutch pedal;

upper clutch signal mechanically connected with said clutch pedal and closed in response to the slight depression of said clutch pedal to generate a clutch signal indicative of the depression of said clutch pedal, said clutch signal being supplied to said control means so as to use for said judgement; and lower clutch switch mechanically connected with said clutch pedal and closed in response to the full depression of said clutch pedal; wherein said control means is connected with said starter relay through said lower clutch switch to supply said starter drive signal to said starter relay through said lower clutch switch.

* * * * *